W. R. SAVAGE.
OPTICAL SHUTTER.
APPLICATION FILED AUG. 16, 1912.

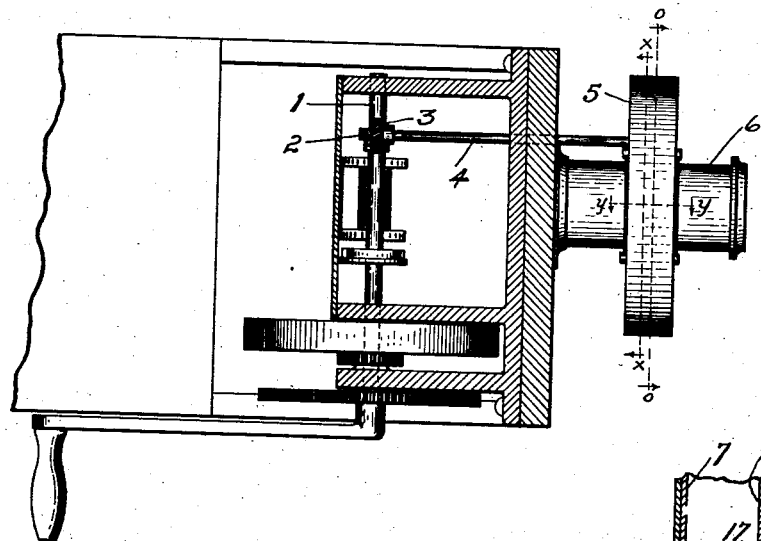
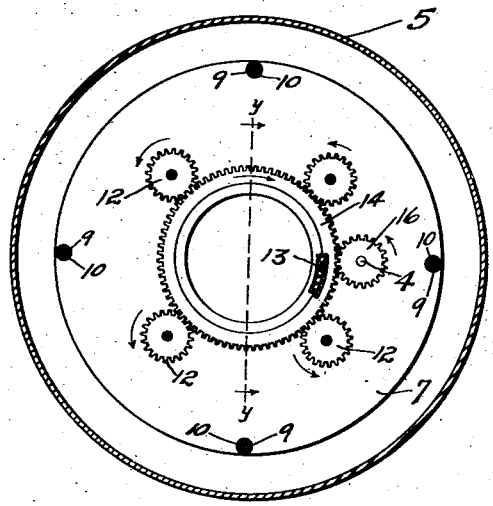
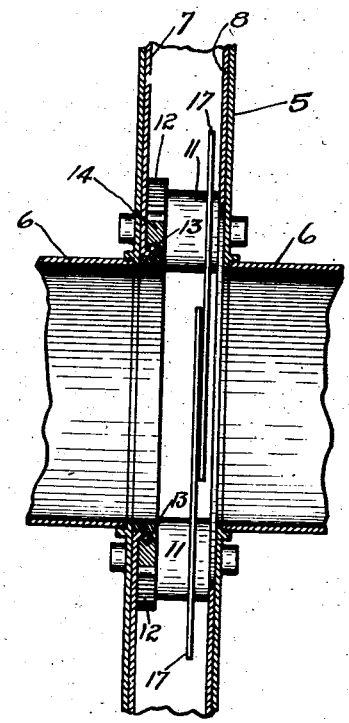
W. R. SAVAGE.
OPTICAL SHUTTER.
APPLICATION FILED AUG. 16, 1912.
1,150,543.
Patented Aug. 17, 1915.
3 SHEETS—SHEET 1.
Will R. Savage, Inventor.

1,150,543.

Patented Aug. 17, 1915.
3 SHEETS—SHEET 2.

Witnesses:
A. R. Mitchell.
M. S. Walker.

Inventor,
Will R. Savage.
By David O. Barnell,
Attorney.

W. R. SAVAGE.
OPTICAL SHUTTER.
APPLICATION FILED AUG. 16, 1912.

1,150,543.

Patented Aug. 17, 1915.
3 SHEETS—SHEET 3.

Will R. Savage, Inventor,

Witnesses:
A. R. Mitchell
M. S. Walker.

By David O. Barnell,
Attorney.

UNITED STATES PATENT OFFICE.

WILL R. SAVAGE, OF OMAHA, NEBRASKA.

OPTICAL SHUTTER.

1,150,543.  Specification of Letters Patent.  Patented Aug. 17, 1915.

Application filed August 16, 1912. Serial No. 715,508.

*To all whom it may concern:*

Be it known that I, WILL R. SAVAGE, a citizen of the United States, and a resident of Omaha, in the county of Douglas and State of Nebraska, have invented certain new and useful Improvements in Optical Shutters, of which the following is a specification.

My invention relates to shutters for optical apparatus, and especially to shutters for use with motion-picture mechanism.

It is the object of my invention to provide a shutter mechanism which, when used with motion picture projection apparatus, will give the maximum transmission of light consistent with complete closure during the film-shifting period, and which will eliminate all perceptible movement of the shutter on the projection screen by producing a diaphragmic opening for the passage of the light, that is, a symmetrical opening concentric with the axis of projection. My invention also contemplates a camera shutter having the above characteristics, for use in taking motion-pictures.

Constructions embodying my invention are illustrated in the accompanying drawings, in which—

Figure 4:
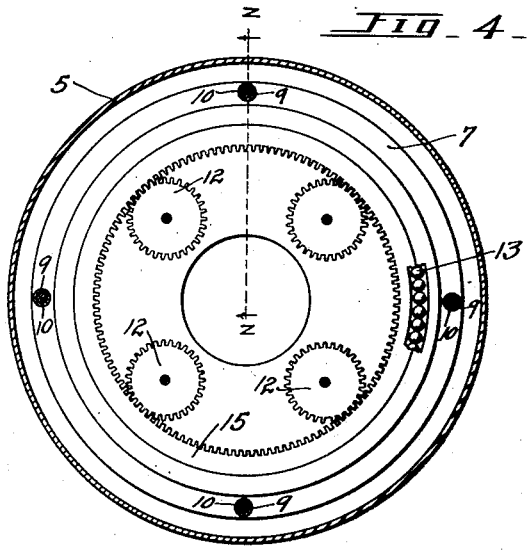
Figure 5:
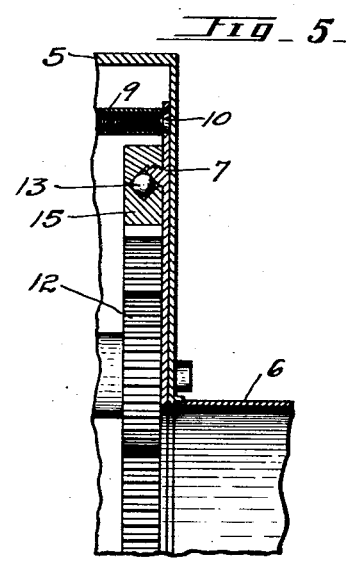
Figure 6:
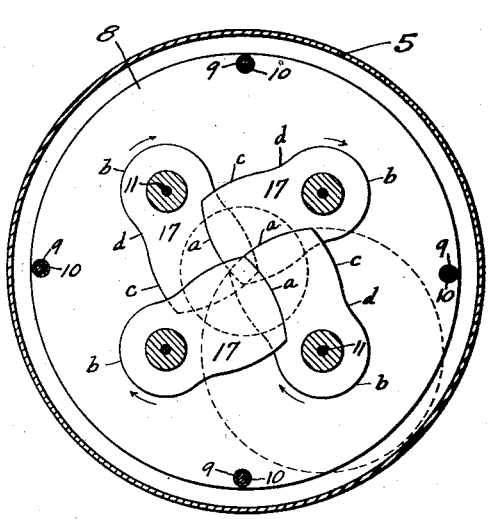
Figure 7:
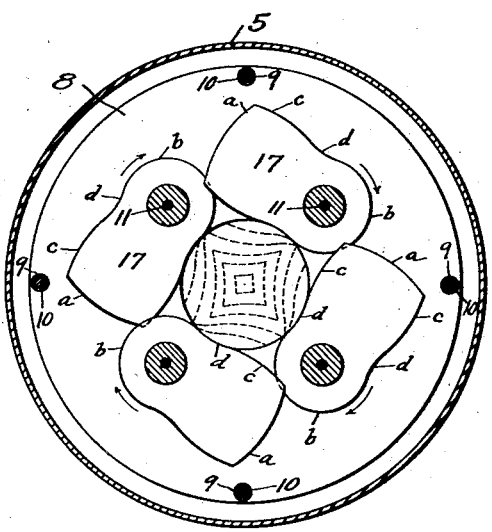
Figure 8:
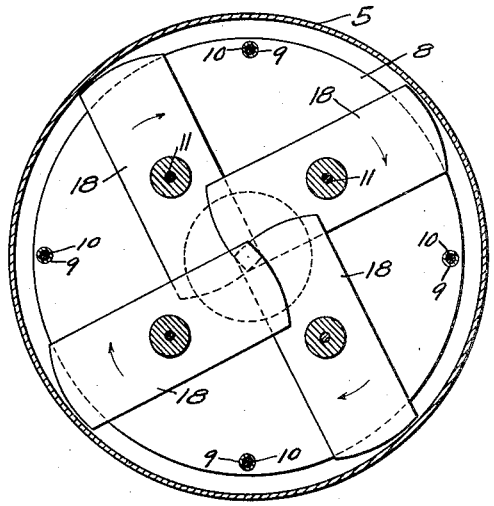
Figure 9:
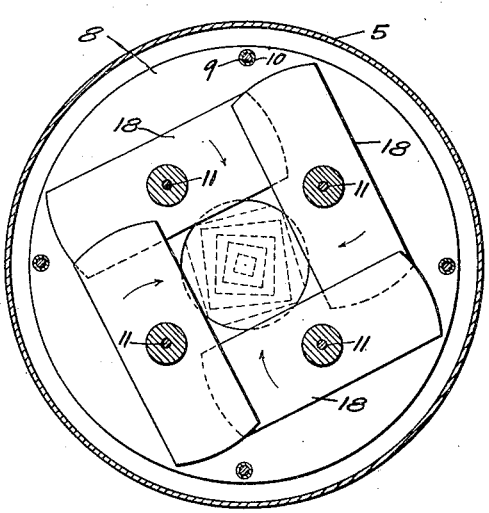

Figure 1 is a plan view, partly in section, showing the shutter mechanism applied to a motion-picture camera or projection apparatus, Fig. 2 is a transverse section through the shutter casing on the plane of the line $x$—$x$ of Fig. 1, Fig. 3 is a partial axial section on a larger scale, the plane of section being indicated by the lines $y$—$y$ of Figs. 1 and 2, Fig. 4 is a view similar to Fig. 2 showing a modified arrangement of the drive gearing, Fig. 5 is an enlarged detail section on the plane of the line $z$—$z$ of Fig. 4, Figs. 6 and 7 are transverse sections on the plane of the line $o$—$o$ of Fig. 1, showing the shutter wings in closed and open positions, respectively, and Figs. 8, 9, 10 and 11 are similar views showing various wing forms in closed and open positions.

There is represented in Fig. 1 portions of a motion-picture film-shifting mechanism, which may be either that of a camera or of a projection apparatus. In said mechanism a shaft 1, preferably one making a revolution or a half-revolution for each movement of the film, is provided with a spiral gear 2 which meshes with a similar gear 3 carried on the shutter-actuating shaft 4. Said shaft 4 extends into the shutter-casing 5 which is preferably arranged concentrically with the lens-tube or mounting 6 and at a longitudinal position such that the shutter may intersect the optical center of the lens combination. Within the shutter casing is disposed a frame comprising circular plates 7 and 8 which are connected and spaced parallel to each other by suitable posts 9 and screws 10. Each of the plates 7 and 8 has a central circular aperture corresponding with the aperture or opening through the lens-tube. In the preferred construction I employ four wing-arbors 11 which are equidistantly, uniformly and symmetrically spaced about the axis of the aperture, the end portions of the arbors being journaled in the frame-plates 7 and 8. On each of the wing-arbors is secured a pinion 12, said pinions being of uniform size. A ball-bearing 13 is arranged concentrically with the aperture and may be disposed either inside the wing-arbors as shown in Figs. 2 and 3, or outside the wing-arbors as shown in Figs. 4 and 5. An annular gear is supported by said ball-bearing so as to mesh with each of the pinions 12. Said gear may be toothed externally, as the gear 14 in Figs. 2 and 3, or may be toothed internally as the gear 15 in Figs. 4 and 5. The annular gear is driven by the shaft 4 which may have a pinion 16 secured on the end thereof and meshing with the annular gear as shown in Fig. 2, or the shaft may be disposed so as to form a continuation of one of the wing-arbors, in which event the pinion carried by said arbor would become the driving pinion.

The shutter wings are secured to the arbors 11 and may be of various forms. The preferred form for use with motion-picture projecting apparatus is shown in Figs. 6 and 7. Referring to said figures, the wings 17 have curvilinear outlines which include an inner end arc $b$ concentric with the arbor and of a radius such as not to overlap the aperture, an outer end arc $a$ concentric with the arbor and of a radius such as to extend from the arbor slightly beyond the center of the aperture, and side portions formed by a compound curve having a convex portion $c$ adjoining the outer end arc $a$, and a concave portion $d$ adjoining the inner end arc $b$. When the wings are in the position shown in Fig. 7 the arc $b$ is tangent to the aperture, and the portion $d$ has the same radius as the aperture.

Rotation of the annular driving gear causes simultaneous and equal rotary movements of all of the wing-arbors and wings in like directions. The shutter wings in passing the aperture overlap each other as shown in Fig. 6, so as to effectually close the aperture against the passage of light, for a greater or less time according to the width of the wings and the speed with which they are moved. As the movement of the wings is continued from the positions shown in Fig. 6, in the directions indicated by arrows, an opening is formed, concentric with the aperture, said opening at first having four equal sides slightly concave. The form of the opening at several successive positions of the wings is indicated by dotted lines in Fig. 7. By reference to said figure it will be seen that the opening is at all times symmetrical, and that the axis of symmetry remains practically constant, revolving slightly upon the center of the aperture as the wings approach the positions shown in Fig. 7, at which the aperture is fully open. It will also be seen that the aperture is fully open during more than half of the movement of the wings, and that the successive forms of the opening during the movement of closure will be the same as during the movement of opening, but with the axis of symmetry slightly different.

For some purposes, especially for motion-picture cameras, wherein it is necessary to have a short exposure period in order to avoid blurring of the image on the sensitized material, I may employ double wings instead of the single wings hereinbefore referred to. With said double wings the driving mechanism, when arranged to move at the same speed used for the single wings, makes a half instead of an entire revolution for each section of the film exposed by the film-shifting mechanism. The double wings 18 shown in Figs. 8 and 9 have the outer end arcs $a$ concentric with the arbors and of the same radius as the corresponding arcs of the wings 17. The sides of the wings are rectilinear and parallel to each other. These wings during the movements of opening and closure form a square opening, the corners of the square not being effective, of course, when the diagonal of the square exceeds the diameter of the aperture, as when the wings are in the positions shown in Fig. 9. In the latter figure the forms of the openings at several successive positions during the movement of closure are shown by dotted lines.

Figure 10:
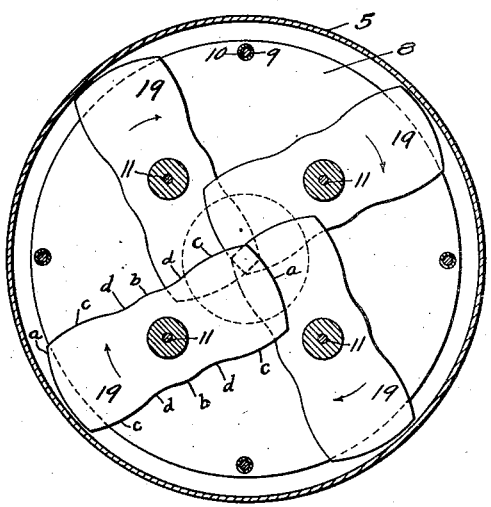
Figure 11:
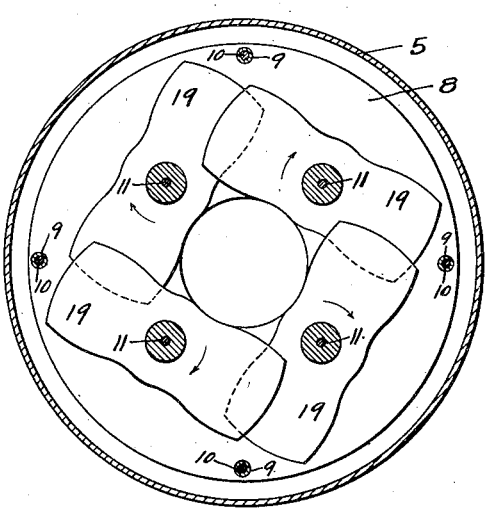

Another form of the double wing is shown in Figs. 10 and 11. These wings 19 give a somewhat greater efficiency in light transmission than the wings 18. The wings 19 have the end arcs $a$, parts of the arcs $b$, and the side arcs $c$ and $d$, all of the same proportions as in the wings 17.

The shutter may be placed so that the wings intercept the light either in front of or behind the lens, but the greatest efficiency is attained by having the plane of the wings substantially intersecting the optical center of the lens combination. In projecting apparatus with the shutter located at this position, all visible movement of the shutter wings on the projecting screen is eliminated, and even if the shutter be moved slowly the transition from complete illumination to darkness, or the reverse, is made by imperceptible gradations.

As most pictures taken are rectangular in form, and a very large proportion nearly square, the advantages of the quadrangular shutter opening will be apparent. It will be noted from Figs. 7 and 9, that when the opposite wing-arbors are located in alinement with the diagonals of a square surface at the focal plane, the forms of the openings between the wings during the movements of opening and closure will agree very closely with the form of the focal-plane surface, especially when the diagonals of the openings through the shutter are less than the diameter of the aperture.

Now, having described my invention, what I claim and desire to secure by Letters Patent is:

1. In a shutter of the class described, shutter wings revolubly mounted on axes equidistantly uniformly and symmetrically disposed about an aperture and fixed relative thereto, the outer end portions of the wings being adapted to overlap each other to close the aperture and movable to positions not overlapping the aperture, and means for continuously revolving the wings about their axes whereby they will alternately close and open the aperture, the wings being shaped so that during the movements of opening and closure they may form between their edges a quadrangular symmetrical opening concentric with the aperture.

2. In a shutter of the class described, four arbors mounted to revolve on axes uniformly spaced apart and equidistant radially from the center of an aperture and fixed relative thereto, actuating means for rotating said arbors simultaneously in like directions, and wings secured to said arbors, the wings having symmetrical outlines, including end arcs concentric with the arbors and sides adapted to form between them a symmetrical quadrangular opening concentric with the aperture.

3. In a shutter of the character described, a plurality of substantially rectangular wings disposed on axes equidistantly spaced about an aperture, and means to rotate the wings, opposite edges of each wing being formed substantially alike, certain edges of the wings adapted to approach closing position together to close the aperture, the opposite edges of the wings adapted to recede together from closing position to open the aperture, whereby the wings form a gradually decreasing and increasing opening of substantially the same geometrical outline during continuous rotation of the wings to and from the closed and open positions.

4. A shutter comprising a plurality of wings rotatably mounted on axes disposed concentrically about an aperture, said axes being spaced equidistant from each other and in fixed relation to the aperture, the wings being movable past said aperture for a portion of their rotation, each wing having sides of similar shape to form with the sides of the other wings a decreasing quadrangular opening concentric with the aperture, as the sides of the wings approach the center of said aperture, and to form a quadrangular opening increasing in size as the wings, in their movement, pass the center of the aperture.

5. In a shutter of the class described, a plurality of rotating wings mounted on axes disposed about an aperture to be closed by said wings, the axes of the wings being fixed relative to the aperture and concentric therewith, said axes being equidistant from each other, each wing for a portion of its rotation being movable past the aperture and provided with a linear extension having two similar sides, a set of corresponding sides of the several wings being so shaped as to form with each other a decreasing quadrangular opening concentric with the aperture, as the wings rotate on their axes in the same direction, and another set of sides of the wings forming with each other a quadrangular opening increasing in size as the wings move in the same direction past the center of the aperture, and means for rotating the wings simultaneously in the same direction.

6. In a shutter, a plurality of wings rotatably disposed on fixed axes about an aperture and each movable past the same for a portion of its rotation, and means to rotate the wings at a predetermined speed and in a given direction whereby the wings will gradually move past the aperture and overlap with each other to close said aperture, the wings being provided with sides of similar shape forming during the movement of the wings a quadrangular opening concentric with the aperture and decreasing in size as the wings move past the aperture.

7. In a shutter, a plurality of wings disposed about an aperture, arbors on which the wings are mounted, said arbors having a fixed relation to the aperture and spaced equidistantly from the center thereof, driving pinions on the arbors for rotating the same, and operating means to drive the pinions in the same direction and at the same rate of speed, each wing being provided with a linear extension movable past the aperture upon rotation of the wing and being of sufficient length to gradually overlap with the other wings to close said aperture, the linear extensions of the wings being shaped so as to form a quadrangular opening concentric with the aperture that decreases in size as the wings overlap.

8. In a shutter, a plurality of wings mounted on axes rotatably disposed about an aperture but having permanent positions relative thereto, said axes being equidistantly spaced from said aperture, the wings being movable past the aperture during a portion of their rotation and being of sufficient length to gradually overlap with each other to close said aperture and upon further movement to gradually unlap to uncover said aperture, each wing having two sides shaped substantially alike, one set of corresponding sides of the wings coöperating with each other to form a quadrangular opening concentric with the aperture that gradually decreases in size as the wings overlap, the other set of corresponding sides forming a quadrangular opening increasing in size as the wings unlap, and means for rotating the wings simultaneously in the same direction and at an equal speed.

9. In a shutter, arbors revolubly mounted on fixed axes uniformly spaced apart and equidistant radially from the center of an aperture, wings secured on said arbors, pinions on the arbors, an annular gear encircling the aperture and meshing with each of the pinions, and means for operating the annular gear to move said wings past said aperture to provide a quadrangular opening which gradually increases in size as the wings move away from each other.

10. In a shutter, arbors revolubly mounted on fixed axes disposed radially from the center of an aperture, wings secured on said arbors, pinions on the arbors, a revoluble annular gear encircling the aperture and meshing with each of the pinions, and means for operating the annular gear to revolve the same and thereby move said wings past said aperture to cover and uncover the same and form alternately contracting and expanding exposure openings.

11. In a shutter of the character described, a plurality of elongated wings pivoted intermediate their ends to rotate together continuously in one and the same direction about an aperture, and means for rotating the wings, all of the wings being shaped alike and each being shaped the same on opposite sides of its pivot with one end of each wing balancing the other end thereof on opposite sides of the pivot so as to reduce the pull or throw and consequent vibration.

12. In a shutter of the character described, a plurality of continuously rotating elongated wings disposed about an aperture, the opposite edges of the wings being symmetrically arranged whereby the wings maintain the same relation upon opening and closing so as to form a plurality of openings of substantially the same geometrical outline during each revolution of the wings, and means for rotating the wings.

13. In a shutter of the character described, a plurality of continuously rotating elongated wings disposed on axes equidistantly spaced about an aperture, the opposite edges of each wing being symmetrically arranged with relation to its axes, whereby the wings form a gradually increasing and decreasing opening of substantially the same geometrical outline during rotation of the wings to and from their closing and open position.

In testimony whereof I have hereunto subscribed my name in the presence of two witnesses.

WILL R. SAVAGE.

Witnesses:
D. O. BARNELL,
A. R. MITCHELL.